March 4, 1969     M. DUMONT     3,430,435

COLLET

Filed Oct. 10, 1967

United States Patent Office 3,430,435
Patented Mar. 4, 1969

3,430,435
COLLET
Marcel Dumont, Bienne, Switzerland, assignor to Virola S.A., Bienne, Switzerland, a company of Switzerland
Filed Oct. 10, 1967, Ser. No. 674,297
Claims priority, application Switzerland, Oct. 14, 1966, 14,898/66
U.S. Cl. 58—115                                    6 Claims
Int. Cl. G04b 17/32

ABSTRACT OF THE DISCLOSURE

A collet without a slot for securing a hair spring to the balance staff in which the opening for securing the collet to the staff has a non-circular cross-section.

---

Figure 1:
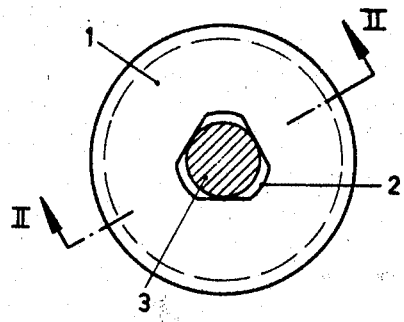

The present invention has for its object an unsplit collet for securing a hair spring to a balance staff.

Several fastening systems employ collets of this type in particular during gluing of the inner coil of the hair spring on the side of the collet, and this in order to eliminate the opening of the resilient slot during driving of the collet on the balance staff which would deform the lateral surface of the collet and place off centre the coil glued on this surface. However the presence of elastic slots facilitates the placing into beat and also secures the collet strongly enough to oppose the torsion of the balance. The adjustment of collets without resilient slots depends upon a very great accuracy in the making of the opening in the collet and in the fabrication of the balance staff.

It has already been proposed to avoid this problem by reducing the friction between the collet and the balance staff by making a recess on this staff or on the inner wall of the collet hole. These two solutions attempt to reduce thereby the friction between the staff and the collet but do not resolve the problem presented by the necessity to adhere to very close tolerances. In order to eliminate production waste, it is necessary to select staffs and collets in such a way as to assemble those having dimensions compatible with the above enumerated requirements. It is obvious that such a procedure wastes time and interferes considerably with the interchangeability of the parts.

The present invention has for its object an unsplit collet for the fastening of a hair spring to a balance staff, characterised by the fact that the opening intended for fastening the said collet to the balance staff has a non-circular cross-section.

The drawing represents by way of example, three embodiments of the present invention.

Figure 2:
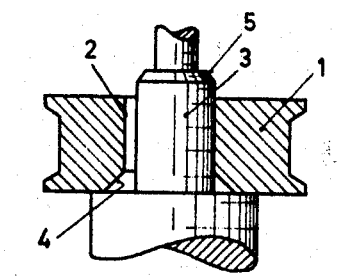
Figure 3:
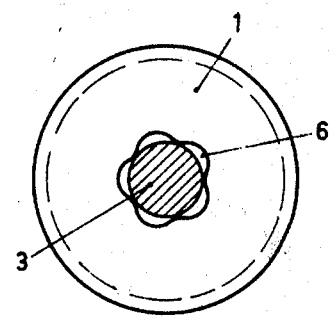
Figure 4:
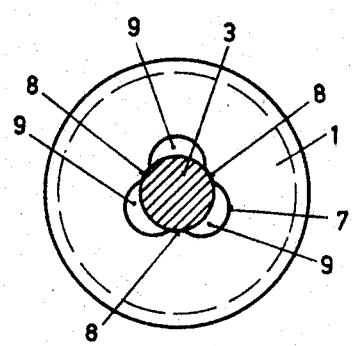

FIGURE 1 is a plan view of the first embodiment;
FIGURE 2 is a cross-section on line II—II of FIGURE 1;
FIGURE 3 is a view of the second embodiment;
FIGURE 4 is a view of the third embodiment.

In FIGURES 1 and 2, the collet is constituted by a disc 1 having no radial slot having a stamped hole 2. This hole has the shape of an equilateral triangle the angles of which are rounded and is flared at its lower part 4 in order to avoid the formation of burrs during drilling. This hole 2 constitutes the perforation intended for securing the collet on the segment 3 of the balance staff. This segment 3 terminates at its upper end in a truncated part 5 facilitating the driving of collet 1. The dimension of hole 2 is calculated in such a way that the circle inscribed between its sides has a diameter slightly less than that of shaft 3 of the balance staff in order to prevent the rotation of the collet around staff 3 under the couple effect exerted by the balance. However the tangential contact between the walls of hole 2 and of staff 3 diminishes considerably the friction and makes it possible to turn the collet by means of a suitable tool during the operation of indexing.

The effect of differences and dimension between hole 2 and stamp 3 is less than in the adjustment of two circular cylindrical parts. In effect since the contact takes place on three tangential points, there can occur slight deformation of the wall of hole 2 at these points which ensures solid fastening without gripping. The collet can be made of metal (for example brass) or in plastic material, while balance staff 3 is of tempered steel. In the case of relatively thicker collets, there can be made previously an opening smaller than hole 2 made during machining of the collet.

FIGURE 3 shows a modification in which an opening 6 made in collet 1 has an approximately hypocyclic hole obtained by stamping.

In FIGURE 4, opening 7 has three cylindrical arcs 8 separated by three relief angles or clearances 9. This collet illustrates a modification which can be obtained directly during machining of collet 1.

Opening 7 is obtained by a first perforation machined by a drill the diameter of which is slightly less than that of staff 3 and the centre of which is on the axis of hole 7. Three drills are then used to successively machine the clearances 9 in order to leave behind only the circular arcs 8 of the first opening.

In the previously described examples, the openings can be made before securing the collets to the inner end of the spring or after securing. In this latter instance, it is possible to advantageously proceed in known manner by centering the collet relative to the inner turns of the hair spring by perforating the collet along an axis located on the origin of the spring. It is also possible to centre the axis of the opening at the origin of the spiral described by the spring.

What is claimed is:
1. A non-slotted collet for securing a hair spring to a balance staff, said collet having an opening for securing said collet to said balance staff, said opening having a non-circular cross-section having at least two bearing surfaces engaging said balance staff.
2. Collet according to claim 1, wherein said opening is flared at one extremity thereof.
3. Collet according to claim 1, wherein said cross-section of said opening has at least three tangential points with an inscribed circle the diameter of which does not exceed the segment of the balance staff on which said collet is secured.
4. Collet according to claim 1, wherein the axis of said opening is centered at the origin of the spiral described by said spring.
5. Collet according to claim 1, wherein said opening is hypocyclic is cross-section.
6. Collet according to claim 1, wherein said opening is in the form of three cylindrical arcs separated by three relieved portions.

References Cited

UNITED STATES PATENTS

| | | | |
|---|---|---|---|
| 2,529,807 | 11/1950 | Marti | 58—115 |
| 2,567,567 | 9/1951 | Kohlhagen | 58—115 |
| 3,218,794 | 11/1965 | Baehni | 58—115 |

FOREIGN PATENTS

| | | |
|---|---|---|
| 311,287 | 1/1956 | Switzerland. |
| 317,187 | 12/1956 | Switzerland. |
| 375,278 | 3/1964 | Switzerland. |

RICHARD B. WILKINSON, Primary Examiner.
S. A. WAL, Assistant Examiner.